US009679515B2

(12) United States Patent
Lu et al.

(10) Patent No.: US 9,679,515 B2
(45) Date of Patent: Jun. 13, 2017

(54) LED DRIVING CIRCUIT AND CONTROL SYSTEM

(71) Applicant: Leyard Optoelectronic Co., Ltd., Beijing (CN)

(72) Inventors: Changjun Lu, Beijing (CN); Zhiyong Lui, Beijing (CN)

(73) Assignee: LEYARD OPTOELECTRONICS CO., LTD., Beijing (CN)

( * ) Notice: Subject to any disclaimer, the term of this patent is extended or adjusted under 35 U.S.C. 154(b) by 40 days.

(21) Appl. No.: 14/647,005

(22) PCT Filed: May 31, 2013

(86) PCT No.: PCT/CN2013/076607
§ 371 (c)(1),
(2) Date: May 22, 2015

(87) PCT Pub. No.: WO2014/082434
PCT Pub. Date: Jun. 5, 2014

(65) Prior Publication Data
US 2015/0302796 A1 Oct. 22, 2015

(30) Foreign Application Priority Data
Nov. 29, 2012 (CN) .......................... 2012 1 0501152

(51) Int. Cl.
G09G 3/34 (2006.01)
G09G 5/10 (2006.01)
(Continued)

(52) U.S. Cl.
CPC ............. *G09G 3/3225* (2013.01); *G06F 1/10* (2013.01); *G09G 3/2092* (2013.01); *G09G 3/32* (2013.01);
(Continued)

(58) Field of Classification Search
CPC .. B41J 2202/20; B41J 2/04505; B41J 2/0451; G06F 21/554; G06F 21/57; G06F 21/575
See application file for complete search history.

(56) References Cited

U.S. PATENT DOCUMENTS 6,160,354 A 12/2000 Ruvinskiy et al.
8,258,604 B2 9/2012 Bando et al.
(Continued)

FOREIGN PATENT DOCUMENTS

CN 101707031 5/2010
CN 101783098 7/2010
(Continued)

*Primary Examiner* — Alexander Eisen
*Assistant Examiner* — Nan-Ying Yang
(74) *Attorney, Agent, or Firm* — Diederiks & Whitelaw, PLC

(57) ABSTRACT

A Light-Emitting Diode (LED) driving circuit and a control system includes: a driving control circuit and a constant current channel group circuit, wherein the driving control circuit includes: a logic control circuit and a clock delay circuit; the logic control circuit is connected with the constant current channel group circuit, and is configured to control the ordered switching-on or switching-off of the constant current channel group circuit by virtue of a data control signal; and the clock delay circuit is connected with the logic control circuit, configured to acquire a timing control signal synchronous with the data control signal and output the timing control signal and integrated in the LED driving circuit.

13 Claims, 13 Drawing Sheets

(51) Int. Cl.
*G09G 3/3225* (2016.01)
*G06F 1/10* (2006.01)
*G09G 3/20* (2006.01)
*G09G 3/32* (2016.01)
*G09G 5/00* (2006.01)
*H05B 33/08* (2006.01)

(52) U.S. Cl.
CPC ........... *G09G 3/3426* (2013.01); *G09G 5/006* (2013.01); *H05B 33/0827* (2013.01); *H05B 33/0842* (2013.01); *G09G 2310/0272* (2013.01); *G09G 2310/08* (2013.01); *G09G 2320/02* (2013.01); *G09G 2320/0223* (2013.01); *G09G 2330/06* (2013.01); *G09G 2370/08* (2013.01); *G09G 2380/14* (2013.01)

(56) References Cited

U.S. PATENT DOCUMENTS 9,262,989 B2  2/2016  Kawana et al.
2004/0183794 A1  9/2004  Akahori
2010/0045588 A1*  2/2010  Lee ...................... G09G 3/2096
                                                       345/99
2010/0283397 A1*  11/2010  Chen .................. H05B 33/0827
                                                       315/192
2012/0126712 A1*  5/2012  Kim .................... H05B 33/0827
                                                       315/187
2012/0139977 A1  6/2012  Lee
2012/0166006 A1*  6/2012  Hung .................. A61B 5/6892
                                                       700/295

FOREIGN PATENT DOCUMENTS

| | | |
|---|---|---|
| CN | 101785118 | 7/2010 |
| CN | 102006696 | 4/2011 |
| CN | 203086778 | 7/2013 |
| JP | 10-153760 | 6/1998 |
| JP | 2000029447 | 1/2000 |
| JP | 2002091382 | 3/2000 |
| JP | 2002244619 | 8/2002 |
| JP | 2006243578 | 9/2006 |

* cited by examiner

US 9,679,515 B2

LED DRIVING CIRCUIT AND CONTROL SYSTEM

CROSS-REFERENCE TO RELATED APPLICATIONS

This application represents a National Stage of PCT/CN2013/076607 filed on May 31, 2013 which claims priority to Chinese Application No. 201210501152.0, filed on Nov. 29, 2012. The entire disclosure of each of the above applications is incorporated herein by reference.

TECHNICAL FIELD OF THE DISCLOSURE

The disclosure relates to the field of Light-Emitting Diode (LED) control, in particular to an LED driving circuit and a control system.

BACKGROUND OF THE DISCLOSURE

FIG. 1 is an internal structure diagram of an LED driving circuit according to related art.

As shown in FIG. 1, a current LED driving circuit consists of a driving control circuit and a constant current channel group circuit, and the driving control circuit is a logic circuit. The driving control circuit includes serial data ports (wherein, the serial data ports include ports Serial Data Input (SDI), Serial Clock (SCLK), Logic Element (LE), Output Enable (OE) and Serial Data Output (SDO)) and a constant current channel control signal set. The serial data ports are responsible for inputting control signals of a system into the LED driving circuit and outputting the control signals of the system out of the LED driving circuit to control each constant current channel of a constant current channel group circuit to be orderly switched on or switched off through the constant current channel control signal set. Wherein, SDI is a data input signal port, SCLK is a shift pulse signal port, LE is a data latching signal port, OE is a unified enable control signal port of a constant current input interface set, and SDO is a data output signal port. Each constant current channel includes a current input end, a current output end and a signal control end, the current input ends of the constant current channel group circuit are connected to the constant current input interface set, and are used for connecting cathodes of LEDs, the current output ends of the constant current channel group circuit are interconnected to an external pin GND of the LED driving circuit, and the signal control ends of the constant current channel group circuit are connected to the constant current channel control signal set.

FIG. 2 is a diagram of cascading application of an LED driving circuit according to related art.

As shown in FIG. 2, a display control logic circuit and N LED driving circuits connected end to end in series are involved in the cascading application of the current LED driving circuit.

A control signal port of the display control logic circuit is connected to the serial data ports SDI, SCLK, LE, OE and SDO of the LED driving circuits, and controls the display of an LED unit board through transmitted serial data.

The control signal port includes: a serial data output signal port C_SDI, a serial data shift pulse signal port C_SCLK, a latching signal port of serial data C_LE and a serial data enable signal port C_OE. Wherein C_SDI is connected to SDI of the first LED driving circuit, and C_SCLK, C_LE and C_OE are respectively interconnected to SCLKs, LEs and OEs of the N LED driving circuits in a bus way. Every two LED driving circuits are interconnected through SD's and SDOs.

SCLK, LE and OE of the current LED driving circuit are interconnected to the display control logic circuit in the bus way, there are many control signals, a difficulty in the wiring of a Printed Circuit Board (PCB) is high, and an anti-interference capability of the control signals is relatively lower.

The large number of a cascaded LED driving circuits may cause a signal transmission problem, and part A in FIG. 5 shows the output signals of the display control logic circuit, wherein C_SDI is the serial output data port, C_SCLK is the shift pulse signal port, an ascending edge of which acquires serial data in a shift register of the logic circuit, and C_LE is the latching signal port of serial data, an ascending edge of which outputs the data of the shift registers in each controlled LED driving circuit in parallel into the signal control ends of the constant current channels.

Part B in FIG. 5 shows a signal diagram of serial data ports of an LED driving circuit of a final stage shown in FIG. 2 during cascading application. After multiple stages of LED driving circuits are connected in series, a signal SDI received by the serial data input port of the final stage has a time delay T_SDI which is caused by the stage-by-stage accumulation of delays of the logic circuits of the N LED driving circuits; and because SCLK/LE/OE do not have any delay, a data change of SDI occurs to an ascending edge of SCLK, the logic circuit part of the LED driving circuit acquires the data of SDI according to an SCLK signal, and acquires the data into the shift register, but the data at this moment is wrong, which may cause an error of a content displayed by the LEDs.

For the problems of high difficulty in the wiring of the PCB, relatively lower anti-interference capability of the control signals and LED display error, which are caused by large control signal number and serial output data delay, during the cascading application of the LED driving circuit in related art, there is yet no effective solution.

SUMMARY OF THE DISCLOSURE

For the problems of high difficulty in the wiring of a PCB, relatively lower anti-interference capability of control signals and LED display error, which are caused by large control signal number and serial output data delay, during the cascading application of the LED driving circuit in the related art, there is yet no effective solution. To this end, a main purpose of the disclosure is to provide an LED driving circuit and a control system, so as to solve the problems.

In order to achieve the purpose, according to one aspect of the disclosure, an LED driving circuit is provided, which includes: a driving control circuit and a constant current channel group circuit, wherein the driving control circuit includes: a logic control circuit and a clock delay circuit, wherein the logic control circuit is connected with the constant current channel group circuit, and is configured to control an ordered switching-on or switching-off of the constant current channel group circuit by virtue of a data control signal; and the clock delay circuit is connected with the logic control circuit, and is configured to acquire a timing control signal synchronous with the data control signal, and output the timing control signal.

Furthermore, the timing control signal includes: a shift pulse signal; an input end of the driving control circuit includes: a shift pulse input port; an output end of the driving control circuit includes: a shift pulse output port, wherein the clock delay circuit includes a shift delay input port, a clock delay sub-circuit and a delay output port, wherein the shift delay input port is connected with the shift pulse input port, and is configured to receive the shift pulse signal; the clock delay sub-circuit is connected between the shift delay input port and the logic control circuit, and is configured to perform delaying processing on the shift pulse signal to acquire a shift pulse signal synchronous with the data control signal by virtue of delay data generated by the clock delay sub-circuit; and the delay output port is connected between the clock delay sub-circuit and the shift pulse output port, and is configured to output the shift pulse signal.

Furthermore, the clock delay circuit includes: a reading device, wherein an input end of the reading device is connected with the logic control circuit, and is configured to read the delay data in a delay table of the logic control circuit; and an output end of the reading device is connected with the clock delay sub-circuit, and is configured to transmit the delay data to the clock delay sub-circuit.

Furthermore, the timing control signal includes: a data latching signal; the input end of the driving control circuit includes: a data latching input port; the logic control circuit includes a latching input port; and the latching input port is connected with the data latching input port, and is configured to receive the data latching signal.

Furthermore, the timing control signal includes: an enable control signal; the input end of the driving control circuit includes: an enable control input port; the logic control circuit includes an enable input port; and the enable input port is connected with the enable control input port, and is configured to receive the enable control signal.

Furthermore, the input end of the driving control circuit includes: a data input port; the output end of the driving control circuit includes: a data control output port; the logic control circuit includes: a logic control sub-circuit, a first control input port, a first control output port and a second control output port, wherein the first control input port is connected with the data input port, and is configured to receive the data control signal; the logic control sub-circuit is connected between the first control input port and the clock delay circuit, and is configured to generate a logic control signal by virtue of the data control signal and the timing control signal; the first control output port is connected with the logic control sub-circuit, is connected with the constant current channel group circuit through a constant current channel control signal set, and is configured to output the logic control signal to the constant current channel group circuit; and the second control output port is connected between the logic control sub-circuit and the data control output port, and is configured to output the data control signal.

Furthermore, the constant current channel group circuit includes one or more constant current logic components, wherein a first end of each constant current logic component is connected with a power end or grounding end of power supply equipment; a second end of each constant current logic component is connected with anodes or cathodes of LED particles in a corresponding column in an LED display panel; and a third end of each constant current logic component is connected with a corresponding connection terminal in the constant current channel control signal set.

Furthermore, the logic control sub-circuit includes: a sub-processor, connected between the constant current channel group circuit and the reading device and configured to read the delay data corresponding to the number of the constant current logic components in the constant current channel group circuit.

In order to achieve the purpose, according to the other aspect of the disclosure, an LED control system is provided, which includes: a display driving circuit, the display driving circuit includes multiple LED driving circuits and further includes a display control circuit, wherein the display control circuit is connected with a control end of each LED driving circuit through a driving control port, and is configured to control the switching-on or switching-off of each LED driving circuit.

Furthermore, the driving control port includes: a data output port, a shift pulse output port, a data latching output port and an enable control output port, wherein a data input port of a first LED driving circuit is connected with the data output port, and is configured to receive a data control signal, a data input port of a (i+1)th LED driving circuit is connected with a data control output port of a ith LED driving circuit, and is configured to receive the data control signal, and i is a natural number greater than or equal to 1; a shift pulse input port of the first LED driving circuit is connected with the shift pulse output port, and is configured to receive a shift pulse signal, a shift pulse input port of the (i+1)th LED driving circuit is connected with a second delay output port of the ith LED driving circuit, and is configured to receive a shift pulse signal synchronous with the data control signal, and i is a natural number greater than or equal to 1; a data latching input port of each LED driving circuit is connected with the data latching output port respectively, and is configured to receive a data latching signal; and an enable control input port of each LED driving circuit is connected with the enable control output port respectively, and is configured to receive an enable control signal.

Furthermore, the display driving circuit includes: a switching circuit, wherein a first end of one of the switching circuit and a constant current channel group circuit in each LED driving circuit is connected to a power end of power supply equipment, and a first end of the other of the switching circuit and the constant current channel group circuit in each LED driving circuit is connected to a grounding end of the power supply equipment; a second end of one of the switching circuit and the constant current channel group circuit in each LED driving circuit is connected with an anode of an LED display panel, and a second end of the other of the switching circuit and the constant current channel group circuit in each LED driving circuit is connected with a cathode of the LED display panel, and the control circuit, includes a power supply control circuit, wherein the power supply control circuit is connected with a third end of the switching circuit through a power supply control port, and is configured to control switching-on or switching-off of the switching circuit; and the switching circuit is configured to control power supply of the LED display panel, and the LED driving circuit is configured to control the ordered display of the LED display panel.

Furthermore, the switching circuit includes a switching sub-circuit, and the switching sub-circuit includes one or more field effect transistors, wherein a source of each field effect transistor is connected with the power end or grounding end of the power supply equipment; a drain of each field effect transistor is connected with an anode or cathode of each LED particle in a corresponding line in the LED display panel; and a gate of each field effect transistor is connected with a corresponding connection terminal in the power supply control port.

Furthermore, the switching circuit includes a first switching sub-circuit and a second switching sub-circuit, wherein each of the first switching sub-circuit and the second switching sub-circuit includes one or more field effect transistors;

a source of each field effect transistor in the first switching sub-circuit and the second switching sub-circuit is connected with the power end or grounding end of the power supply equipment; a drain of each field effect transistor in the first switching sub-circuit is connected with an anode or cathode of a Red (R) lamp tube in each LED particle in a corresponding line in the LED display panel, and a gate of each field effect transistor is connected with a corresponding connection terminal in the power supply control port, and is configured to control the power supply of the R lamp tubes of the LED display panel; and a drain of each field effect transistor in the second switching sub-circuit is connected with anodes or cathodes of a Green (G) lamp tube and a Blue (B) lamp tube in each LED particle in a corresponding line in the LED display panel, and a gate of each field effect transistor is connected with a corresponding connection terminal in the power supply control port, and is configured to control the power supply of the G lamp tubes and the B lamp tubes of the LED display panel.

By the disclosure, the clock delay circuit is integrated in the LED driving circuit, and can delay the timing control signal into a signal synchronous with the data control signal, so that the acquisition of wrong data in the data control signal is prevented; moreover, input and output ports for the timing control signal are integrated in the LED driving circuit, so that the number of wires on a PCB is reduced, the problems of high difficulty in the wiring of the PCB, relatively lower anti-interference capability of control signals and LED display error, which are caused by large control signal number and serial output data delay, during the cascading application of the LED driving circuit in the related art are solved, and the effects of synchronizing the data control signal and the timing control signal, reducing the number of the wires on the PCB and reducing the influence of the timing control signal on a signal of the PCB are achieved; therefore, the accurate display of LEDs is ensured, the signal transmission quality and anti-interference capability of an LED unit board are improved, and the difficulty in the wiring of the LED unit board is lowered.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings:

FIG. 9b is a drawing of partial enlargement of a dotted part D in FIG. 9a;

FIG. 10b is a drawing of partial enlargement of a dotted part I in FIG. 10a.

DETAILED DESCRIPTION OF THE EMBODIMENTS

It should be noted that the embodiments of the disclosure and the characteristics in the embodiments can be combined under the condition of no conflicts. The disclosure is descried below with reference to the drawings and embodiments in detail.

Figure 1:
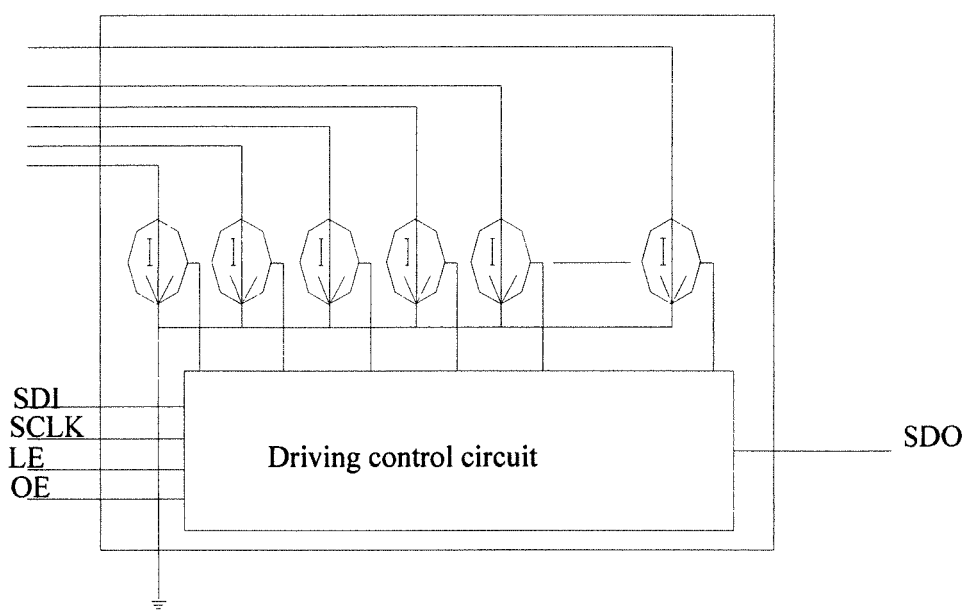
FIG. 1 is an internal structure diagram of an LED driving circuit according to related art.
Figure 2:
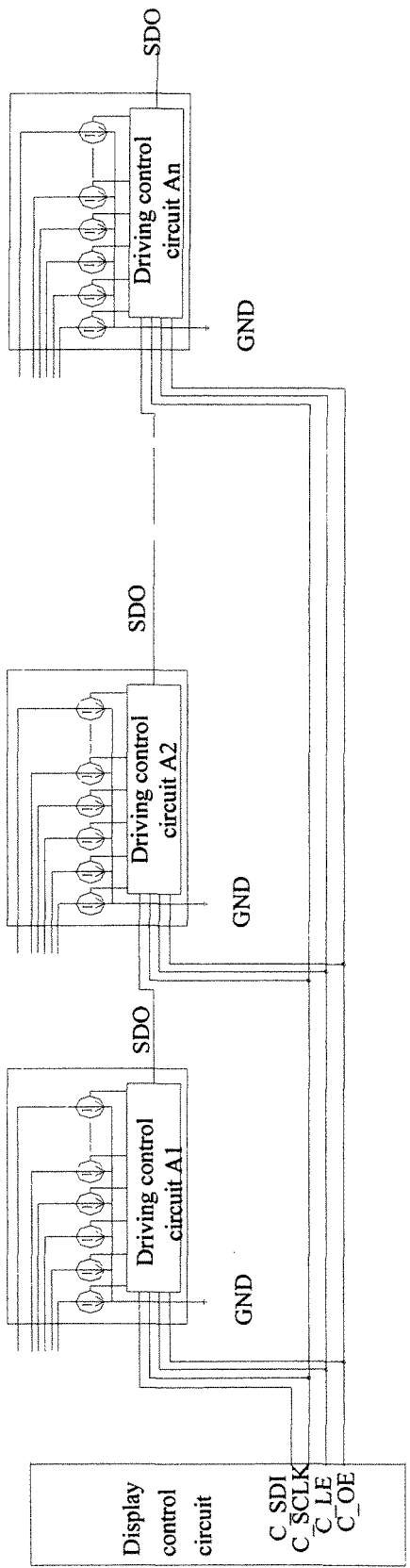
FIG. 2 is a diagram of cascading application of an LED driving circuit according to related art.
Figure 3:
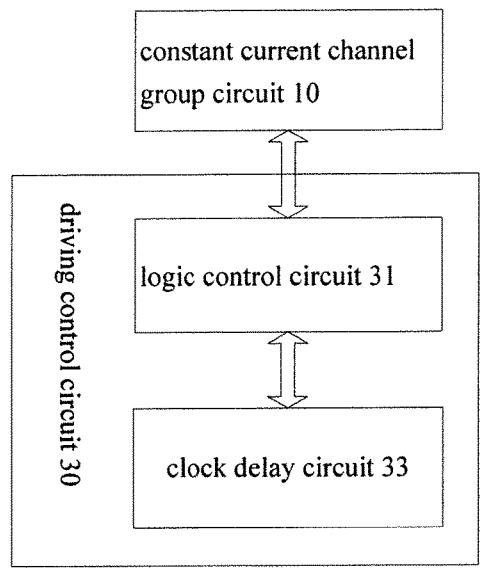
FIG. 3 is a structure diagram of an LED driving circuit according to an embodiment of the disclosure.
Figure 4:
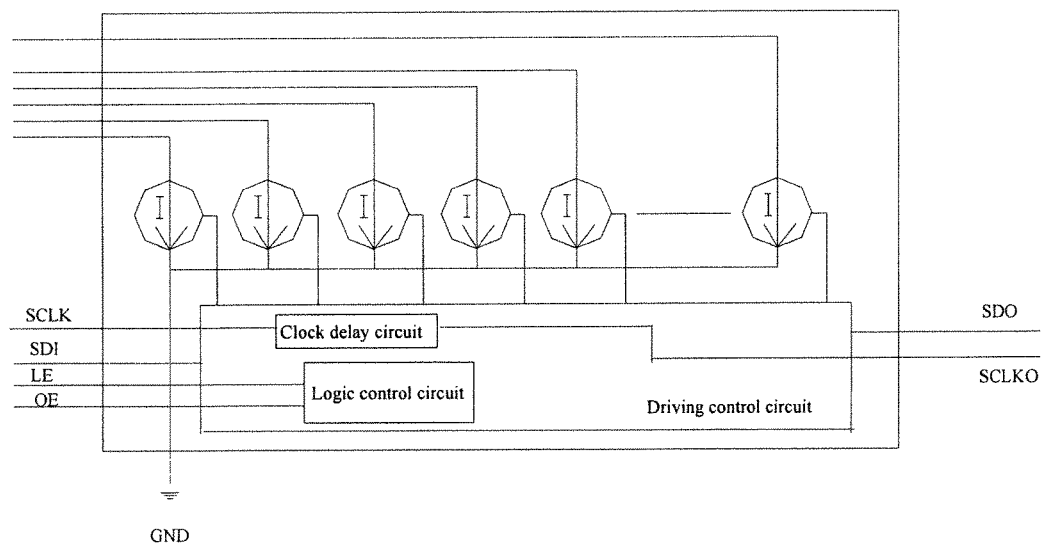
FIG. 4 is a detailed structure diagram of an LED driving circuit according to an embodiment of the disclosure.

FIG. 3 is a structure diagram of an LED driving circuit according to an embodiment of the disclosure. FIG. 4 is a detailed structure diagram of an LED driving circuit according to an embodiment of the disclosure.

As shown in FIG. 3 and FIG. 4, the LED driving circuit includes a driving control circuit 30 and a constant current channel group circuit 10, wherein the driving control circuit 30 includes: a logic control circuit 31 and a clock delay circuit 33; the logic control circuit 31 is connected with the constant current channel group circuit 10, and is configured to control the ordered switching-on or switching-off of the constant current channel group circuit 10 by virtue of a data control signal; and the clock delay circuit 33 is connected with the logic control circuit 31, and is configured to acquire a timing control signal synchronous with the data control signal, and output the timing control signal. Wherein, the clock delay circuit performs delaying processing on the current timing control signal which is acquired to acquire a delayed timing control signal, the delayed timing control signal being synchronous with the data control signal.

By the LED driving circuit of the disclosure, the logic control circuit and the clock delay circuit are arranged in the driving control circuit, the logic control circuit is connected with the constant current channel group circuit, and is configured to control the ordered switching-on or switching-off of the constant current channel group circuit by virtue of the data control signal, and the clock delay circuit is connected with the logic control circuit, and is configured to acquire and output the timing control signal synchronous with the data control signal. By the LED driving circuit of the disclosure, the clock delay circuit is integrated in the LED driving circuit, and can delay the timing control signal into a signal synchronous with the data control signal, so that the acquisition of wrong data in the data control signal is prevented; moreover, input and output ports for the timing control signal are integrated in the LED driving circuit, so that the number of wires on a PCB is reduced, the problems of high difficulty in the wiring of the PCB, relatively lower anti-interference capability of control signals and LED display error, which are caused by large control signal number and serial output data delay, during the cascading application of the LED driving circuit in the related art are solved, and the effects of synchronizing the data control signal and the timing control signal, reducing the number of the wires on the PCB and reducing the influence of the timing control signal on a signal of the PCB are achieved; therefore, the accurate display of LEDs is ensured, the signal transmission quality and anti-interference capability of an LED unit board are improved, and the difficulty in the wiring of the LED unit board is lowered.

In the embodiment of the disclosure, the timing control signal can include: a shift pulse signal; an input end of the driving control circuit includes: a shift pulse input port; an output end of the driving control circuit includes: a shift pulse output port; the clock delay circuit includes a shift delay input port, a clock delay sub-circuit and a delay output port; the shift delay input port is connected with the shift pulse input port, and is configured to receive the shift pulse signal; the clock delay sub-circuit is connected between the shift delay input port and the logic control circuit, and is configured to perform delaying processing on the shift pulse signal to acquire a shift pulse signal synchronous with the data control signal by virtue of delay data generated by the clock delay sub-circuit; and the delay output port is connected between the clock delay sub-circuit and the shift pulse output port, and is configured to output the shift pulse signal synchronous with the data control signal.

Wherein, the delay data can be directly burnt in the clock delay sub-circuit, and can also be read from the logic control circuit through a reading device in the clock delay sub-circuit.

Specifically, an input end of the reading device is connected with the logic control circuit, and is configured to read the delay data in a delay table of the logic control circuit, and the delay data recorded in the delay table can be determined and updated according to the number of constant current logic components included in the constant current channel group circuit 10 connected with the logic control circuit; and an output end of the reading device is connected with the clock delay sub-circuit, and is configured to transmit the delay data to the clock delay sub-circuit.

In the embodiment of the disclosure, the timing control signal can include: a data latching signal; the input end of the driving control circuit includes: a data latching input port; the logic control circuit includes a latching input port; and the latching input port is connected with the data latching input port, and is configured to receive the data latching signal. Wherein, the data latching input port is an LE port in FIG. 4.

In the embodiment of the disclosure, the timing control signal includes: an enable control signal; the input end of the driving control circuit includes: an enable control input port; the logic control circuit includes an enable input port; and the enable input port is connected with the enable control input port, and is configured to receive the enable control signal. Wherein, the enable control input port is an OE port in FIG. 4.

According to the embodiment of the disclosure, the input end of the driving control circuit includes: a data input port; the output end of the driving control circuit includes: a data control output port; the logic control circuit includes: a logic control sub-circuit, a first control input port, a first control output port an a second control output port; the first control input port is connected with the data input port, and is configured to receive the data control signal; the logic control sub-circuit is connected between the first control input port and a first delay output port, and is configured to generate a logic control signal by virtue of the data control signal and the timing control signal; the first control output port is connected with the logic control sub-circuit, is connected with the constant current channel group circuit through a constant current channel control signal set, and is configured to output the logic control signal to a constant current logic circuit; and the second control output port is connected between the logic control sub-circuit and the data control output port, and is configured to output the data control signal.

Specifically, as shown in FIG. 4, the LED driving circuit in the embodiment of the disclosure includes the driving control circuit (i.e. a logic circuit shown in FIG. 4) and the constant current channel group circuit. The logic circuit includes a serial data input end (i.e. the input end of the driving control circuit, including ports SDI, SCLK, LE and OE), a serial data output end (i.e. the output end of the driving control circuit, including ports SDO and Serial Clock Output (SCLKO)), the clock delay circuit, the logic control circuit and the constant current channel control signal set. Wherein, the serial data input port is configured to input the control signals of a system to the LED driving circuit, and the serial data output port is configured to process the control signals and then output the control signals to the LED driving circuit of the next stage. The logic control circuit controls the ordered conducting or cutting-off of each constant current logic component (i.e. constant current channel) in the constant current channel group circuit by virtue of the constant current channel control signal set. Wherein, SDI is a data input signal port (i.e. data input port); SCLK is the input port for the shift pulse signal (i.e. shift pulse input port); LE is a data latching signal port (i.e. data latching input port); OE is a unified enable control signal port (enable control input port) for a constant current input interface set; SDO is a data output signal port (i.e. data control output port); and SCLKO is a shift pulse output signal port (i.e. the first delay output port in the embodiment).

In addition, the logic control sub-circuit can include: a sub-processor, connected between the constant current logic circuit and the reading device and configured to read the delay data corresponding to the number of the constant current logic components in the constant current channel group circuit (i.e. delay time corresponding to the number of the constant current channels in the constant current channel group circuit).

Specifically, the sub-processor in the logic control circuit acquires the number of the constant current logic components in the constant current logic circuit, and calculates the delay data of the constant current logic circuit according to the number of the constant current logic components and the preset delay time of a single constant current logic component, the reading device in the clock delay circuit reads the delay data corresponding to the constant current logic circuit, and transmits the delay data to the clock delay sub-circuit, then the clock delay sub-circuit performs delaying processing on the shift pulse signal, the data latching signal and the enable control signal by virtue of the delay data to acquire the shift pulse signal synchronous with the data control signal respectively, and after the acquired data latching signal and the enable control signal are transmitted to the logic control circuit, the logic control circuit generates the logic control signal by virtue of the data latching signal, the enable control signal and the data control signal, and controls the ordered switching-on or switching-off of the constant current channel group circuit by virtue of the logic control signal.

In the embodiment of the disclosure, the constant current channel group circuit includes one or more constant current logic components, wherein a first end of each constant current logic component is connected with a grounding end or power end of power supply equipment; a second end of each constant current logic component is connected with anodes or cathodes of LED particles in a corresponding column in an LED display panel (i.e. the LED unit board); and a third end of each constant current logic component is connected with a corresponding connection terminal in the constant current channel control signal set.

Specifically, as shown in FIG. 4, each constant current channel includes a current input end, a current output end and a signal control end, wherein the current input ends of the constant current channel group circuit are connected to an input end of a constant current logic channel, and are configured to connect a cathode of the LED display panel, the current output ends of the constant current channel group circuit are interconnected to an external pin GND of the LED driving circuit, and the signal control ends of the constant current channel group circuit are connected to the constant current channel control signal set.

Figure 5:
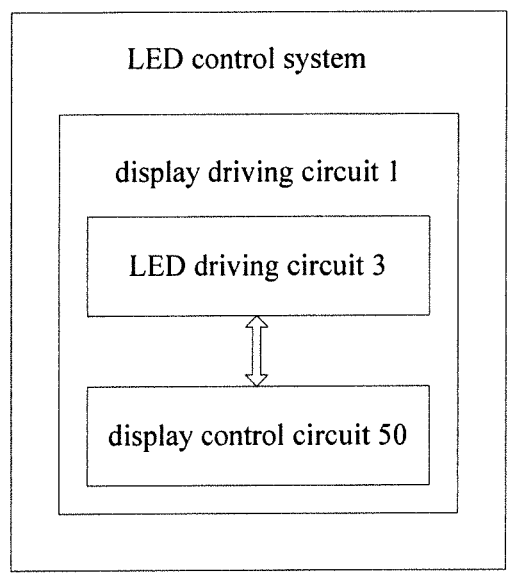
FIG. 5 is a structure diagram of an LED control system according to an embodiment of the disclosure.
Figure 6:
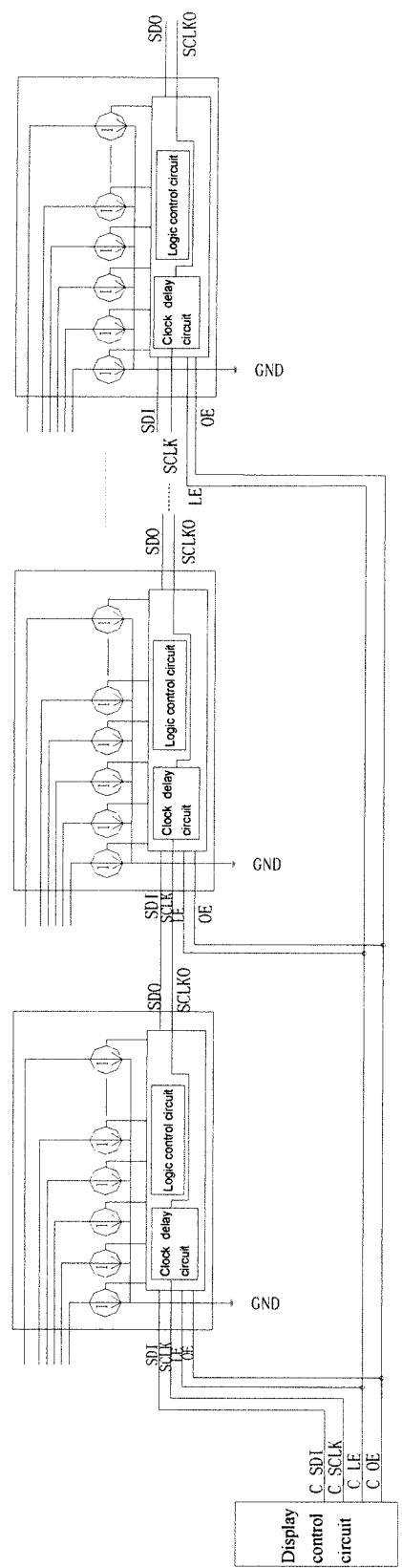
FIG. 6 is a detailed structure diagram of an LED control system according to an embodiment of the disclosure.
Figure 8:
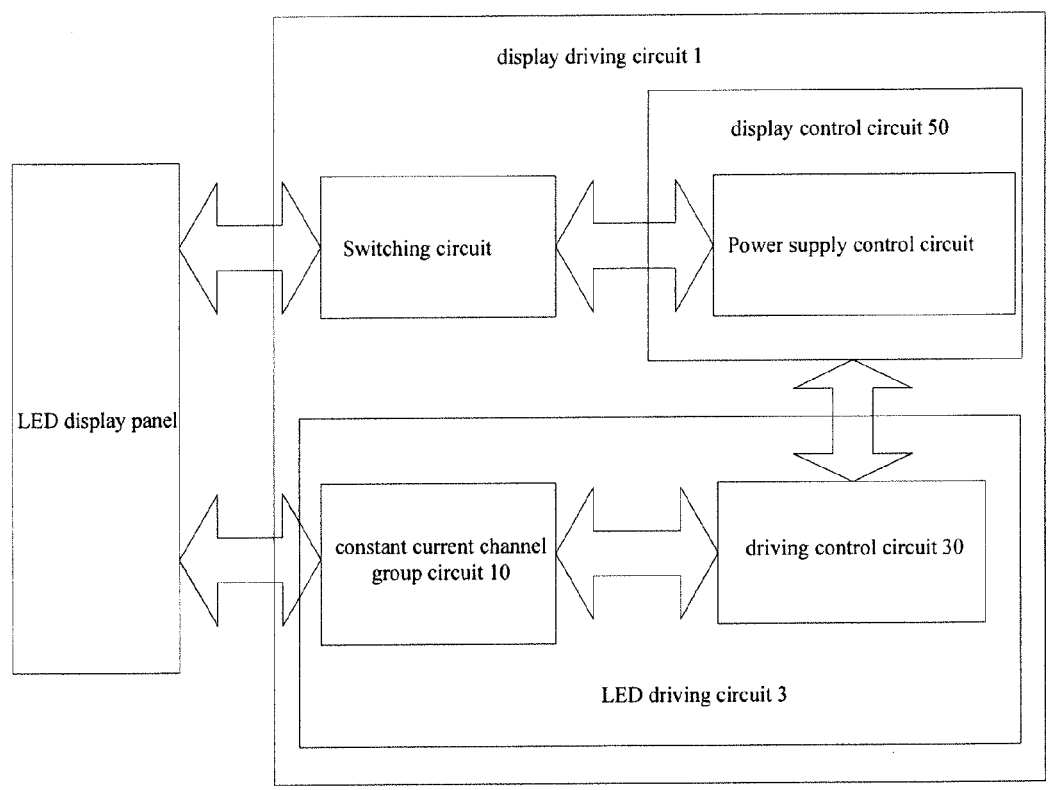
FIG. 8 is a structure diagram of an LED display according to a preferred embodiment of the disclosure.

FIG. 5 is a structure diagram of an LED control system according to an embodiment of the disclosure. FIG. 6 is a detailed structure diagram of an LED control system according to an embodiment of the disclosure. FIG. 8 is a structure diagram of an LED display according to a preferred embodiment of the disclosure.

As shown in FIG. 5, FIG. 6 and FIG. 8, the LED control system includes: a display driving circuit 1, the display driving circuit 1 includes multiple LED driving circuits 3 and further including a display control circuit 50, wherein the display control circuit 50 is connected with a control end of each LED driving circuit 3 through a driving control port, and is configured to control the switching-on or switching-off of each LED driving circuit 3.

By the LED control system of the disclosure, the logic control circuit and the clock delay circuit are arranged in the driving control circuit of the display driving circuit, the logic control circuit is connected with a constant current channel group circuit, and is configured to control the ordered switching-on or switching-off of the constant current channel group circuit by virtue of a data control signal, and the clock delay circuit is connected with the logic control circuit, and is configured to perform delaying processing on a timing control signal to acquire a timing control signal synchronous with the data control signal and output the timing control signal synchronous with the data control signal. By the LED control system of the disclosure, the clock delay circuit is integrated in the LED driving circuit, and can delay the timing control signal into a signal synchronous with the data control signal, so that the acquisition of wrong data in the data control signal is prevented; moreover, input and output ports for the timing control signal are integrated in the LED driving circuit, so that the number of wires on a PCB is reduced, the problems of high difficulty in the wiring of the PCB, relatively lower anti-interference capability of control signals and LED display error, which are caused by large control signal number and serial output data delay, during the cascading application of the LED driving circuit in the related art are solved, and the effects of synchronizing the data control signal and the timing control signal, reducing the number of the wires on the PCB and reducing the influence of the timing control signal on a signal of the PCB are achieved; therefore, the accurate display of LEDs is ensured, the signal transmission quality and anti-interference capability of an LED unit board are improved, the difficulty in the wiring of the LED unit board is lowered, and the cascading number of the LED control system is further increased.

According to the embodiment shown in FIG. 6, the driving control port can include: a data output port, a shift pulse output port, a data latching output port and an enable control output port, wherein a data input port of the first LED driving circuit is connected with the data output port, and is configured to receive the data control signal, a data input port of an (i+1)th LED driving circuit is connected with a data control output port of an ith LED driving circuit, and is configured to receive the data control signal, and i is a natural number greater than or equal to 1; a shift pulse input port of the first LED driving circuit is connected with the shift pulse output port, and is configured to receive a shift pulse signal, a shift pulse input port of the (i+1)th LED driving circuit is connected with a second delay output port of the ith LED driving circuit, and is configured to receive a shift pulse signal synchronous with the data control signal, and i is a natural number greater than or equal to 1; a data latching input port of each LED driving circuit is connected with the data latching output port, and is configured to receive a data latching signal; and an enable control input port of each LED driving circuit is connected with the enable control output port, and is configured to receive an enable control signal.

As shown in FIG. 6, the LED control system includes the display driving circuit and N LED driving circuits which are connected end to end in series.

Specifically, as shown in FIG. 6, an output port of the display driving circuit is the driving control port (i.e. a control signal port), wherein the control signal port includes C_SDI (the data output port, i.e. a serial data output signal output port), C_SCLK (the shift pulse output port, i.e. a serial data shift pulse signal output port), C_LE (the data latching output port, i.e. a serial data latching signal output port) and C_OE (the enable control output port, i.e. a serial data enable signal output port).

Specifically, C_SDI is connected to SDI of the first LED driving circuit, C_SCLK is connected to SCLK of a first new LED driving circuit, and C_LE and C_OE are interconnected to LE and OE of the N LED driving circuits in a bus way respectively. Every two LED driving circuits are interconnected through serial data input ports SDI and SCLK with corresponding serial data output ports SDO and SCLKO.

Figure 7:
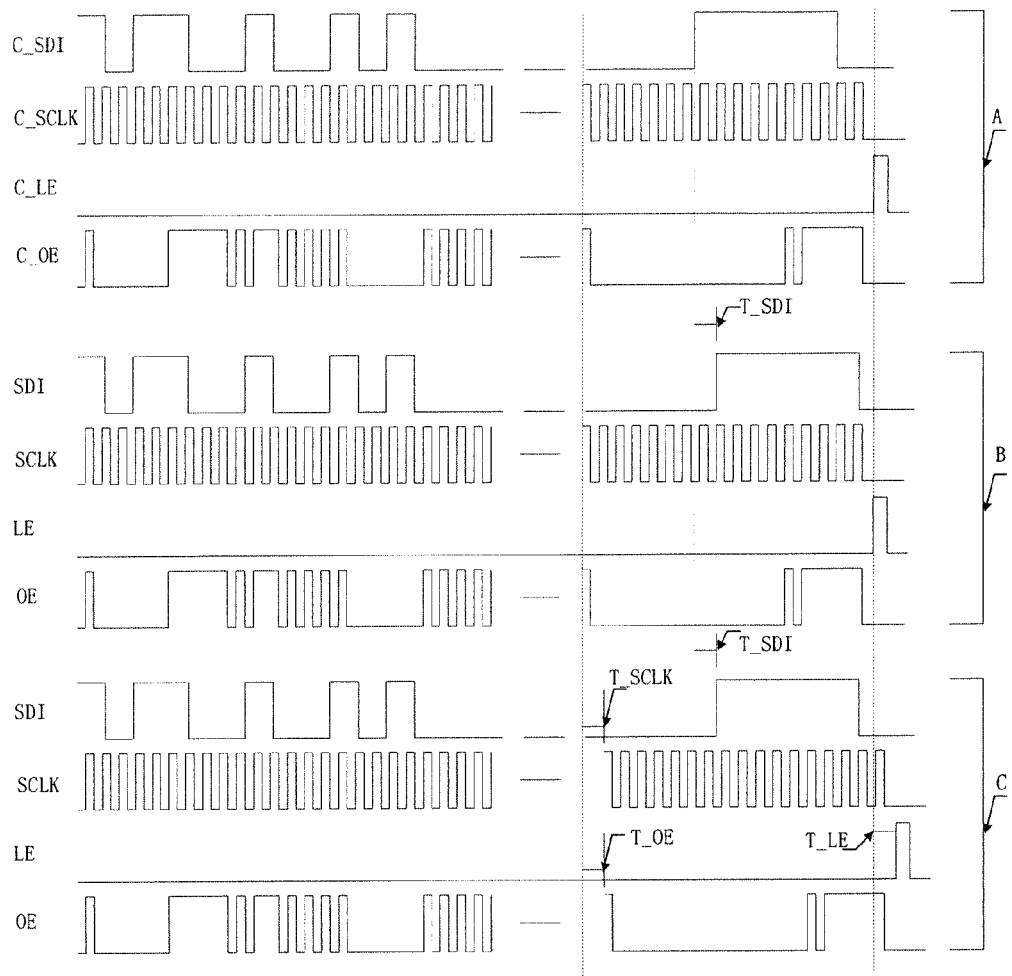
FIG. 7 is a clock diagram of a signal of a data input port according to an embodiment of the disclosure.

FIG. 7 is a diagram of a signal of a data input port according to an embodiment of the disclosure. As shown in FIG. 7, part C in FIG. 7 is a diagram of signals of the serial data input ports of the LED driving circuits in a first stage and a final stage during the cascading application of the LED driving circuits to the LED control system. Compared with that shown by part A, after multiple stages of LED driving circuits are connected to the LED driving circuit in series, each of signals SDI/SCLK/LE/OE received by the serial data input port of the LED driving circuit in the final stage has a time delay, wherein the delay T_SDI of SDI is caused by the stage-by-stage accumulation of the logic control circuits of the N LED driving circuits, the delay T_SCLK of SCLK is controlled by the clock delay circuits of the LED driving circuits, and is accumulatively controlled by the clock delay circuits of the N LED driving circuits, and the delay T_LE of LE and the delay T_OE of OE are simultaneously subjected to the delaying control of the display driving circuit. By ensuring that the timing control signal is synchronously connected to the logic control circuits of the LED driving circuits, more LED driving circuits can be cascaded.

Since the ports SCLK and SCLKO are arranged in the LED driving circuit, the number of the wires on the PCB is reduced, the influence of output signals of the ports SCLK and SCLKO on the other signals of the PCB is reduced, the signal transmission quality and anti-interference capability of the LED unit board are further improved, and the difficulty in the wiring of the LED unit board is lowered.

In the embodiment shown in FIG. 8, the LED control system can further include: a switching circuit, wherein a first end of one of the switching circuit and the constant current channel group circuit 10 in each LED driving circuit 3 is connected to a power end of power supply equipment, and a first end of the other of the switching circuit and the constant current channel group circuit 10 in each LED driving circuit 3 is connected to a grounding end of the power supply equipment; a second end of one of the switching circuit and the constant current channel group circuit 10 in each LED driving circuit 3 is connected with an anode of an LED display panel, and a second end of the other of the switching circuit and the constant current channel group circuit 10 in each LED driving circuit 3 is connected with a cathode of the LED display panel; and a display control circuit 50, including a power supply control circuit, wherein the power supply control circuit is connected with a third end of the switching circuit through a power supply control port, and is configured to control the switching-on or switching-off of the switching circuit; and the switching circuit is configured to control the power supply of the LED display panel, and each LED driving circuit is configured to control the ordered display of the LED display panel.

Specifically, the LED control system includes the display driving circuit, wherein the display driving circuit includes a switching circuit, LED driving circuits and a control circuit; the control circuit can include the display control circuit 50 and the driving control circuit 30; the power supply control circuit in the display control circuit is configured to control the switching-on or switching-off of the switching circuit; the driving control circuit is configured to control the switching-on or switching-off of the LED driving circuits, then control the power supply of the LED display panel (i.e. the LED unit board) by switching on or switching off the switching circuit and control the display of the LED display panel by switching-on or switching-off the LED driving circuits, thereby realizing the ordered display of the LED display panel. By the LED control system, the switching circuit, the LED driving circuits 3 and the control circuit are integrated in the display driving circuit 1, and then more display driving circuits can be placed under the condition of not changing an area of the LED display panel, so that a number ratio of LED particles and the display driving circuits on an LED display with a fixed area is reduced, and a refresh rate is increased; moreover, a connection relationship between an LED particle array with M lines and N columns in the LED display panel and the display driving circuits is clearer, and fewer connection lines are required, so that the design difficulty of the PCB is lowered.

Figure 9A:
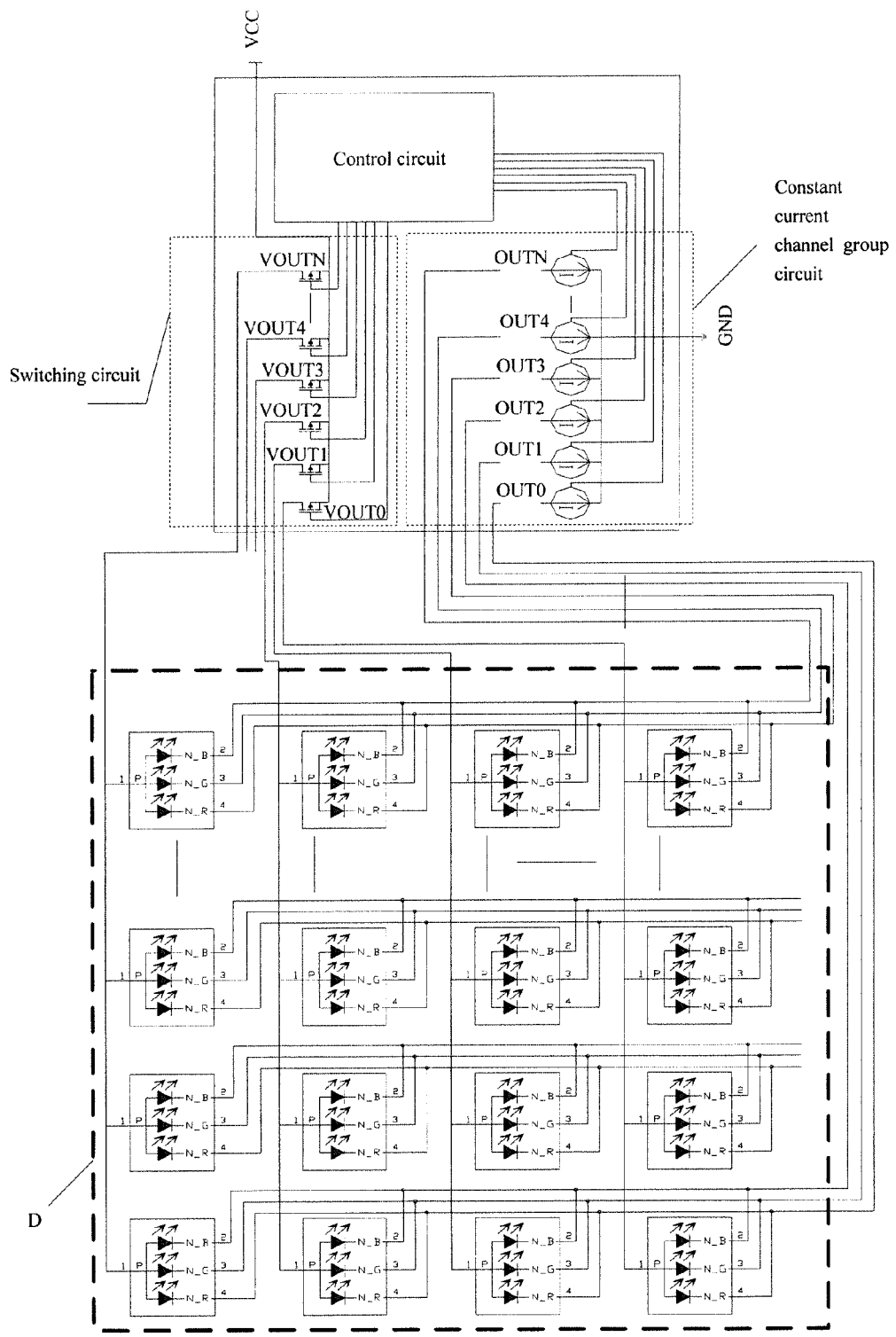
FIG. 9a is a detailed structure diagram of an LED display according to a preferred embodiment of the disclosure.
Figure 9B:
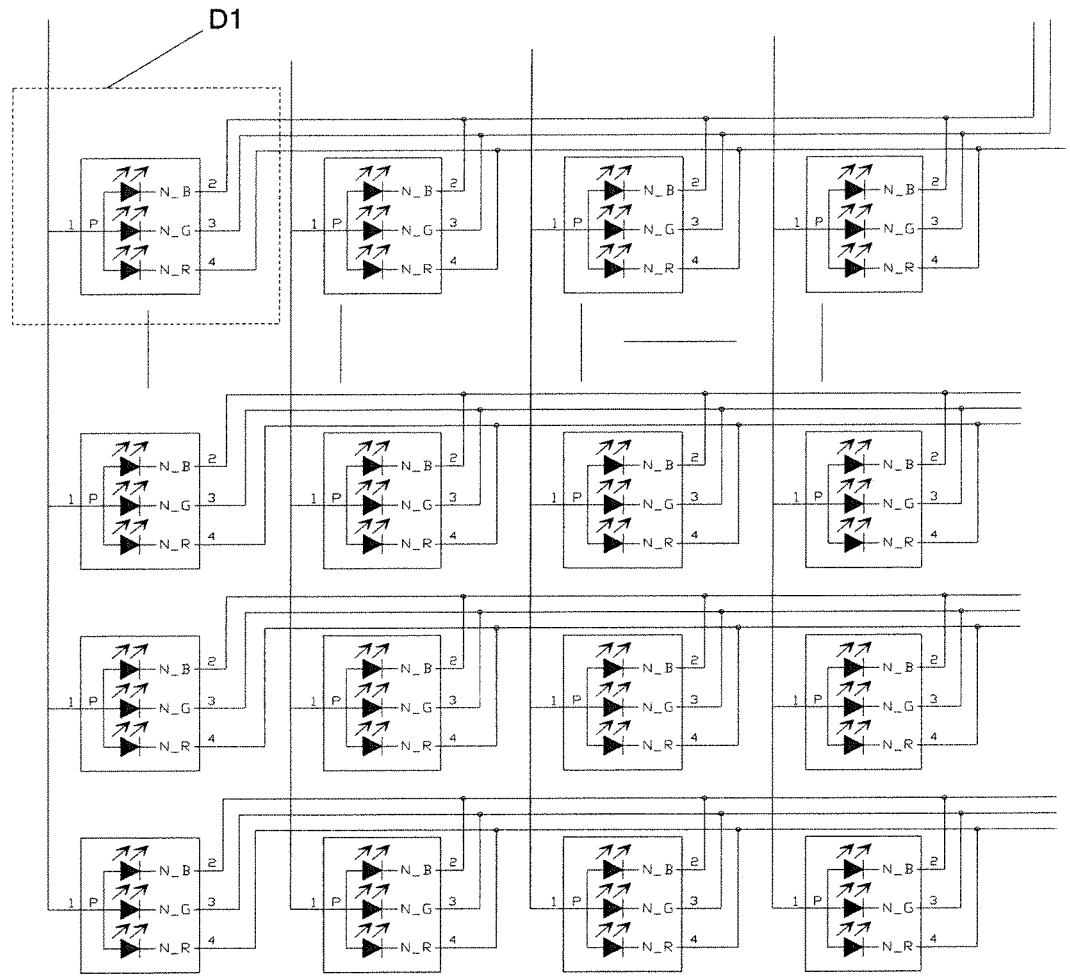
Figure 9C:
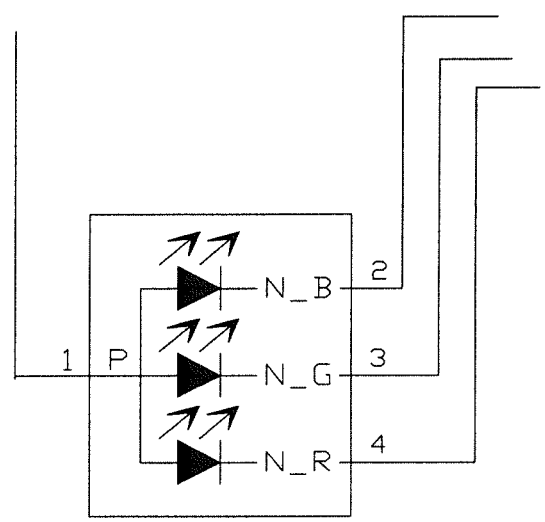
FIG. 9c is a drawing of partial enlargement of a dotted part D1 in FIG. 9b.
Figure 10A:
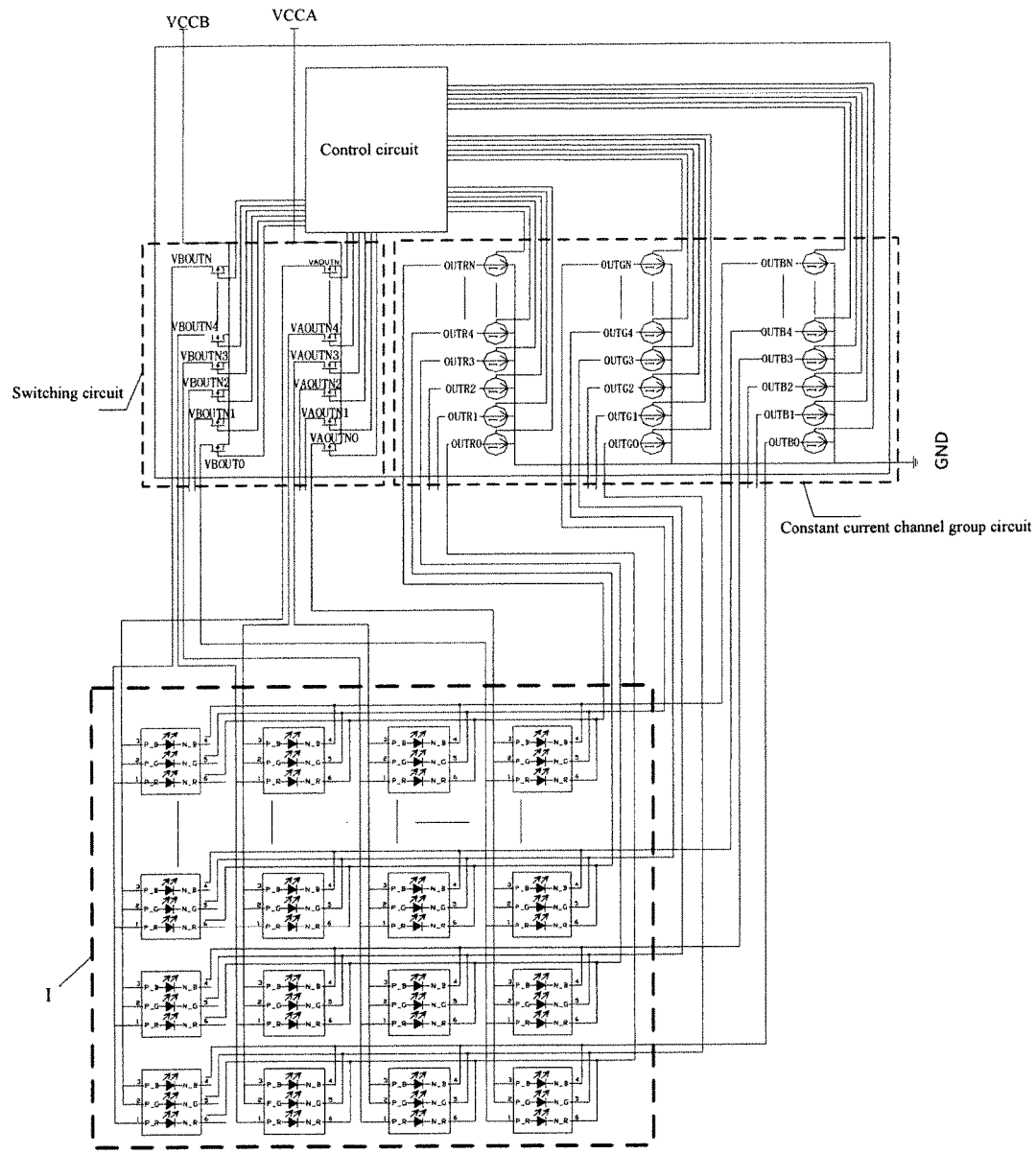
FIG. 10a is a structure diagram of an LED display according to embodiment 5 of the disclosure.
Figure 10B:
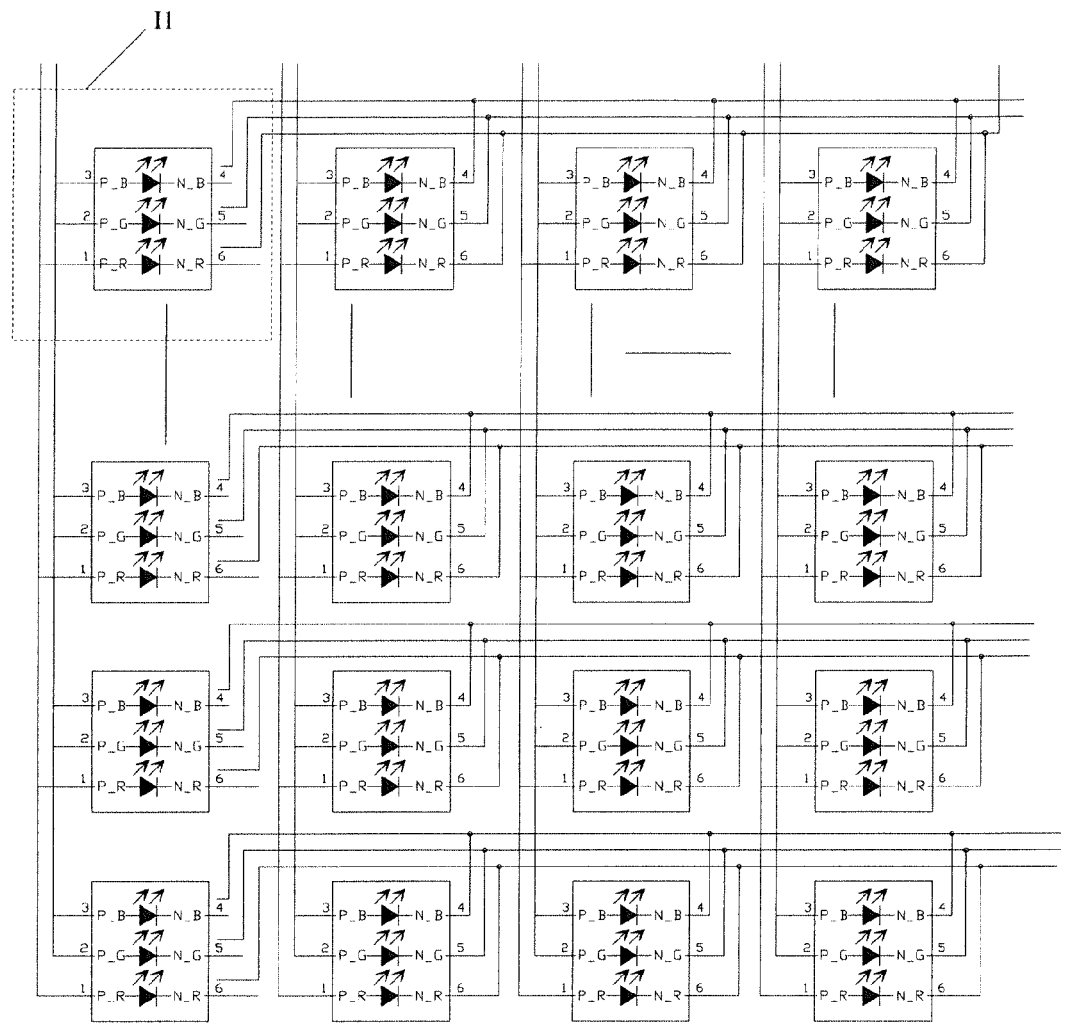
Figure 10C:
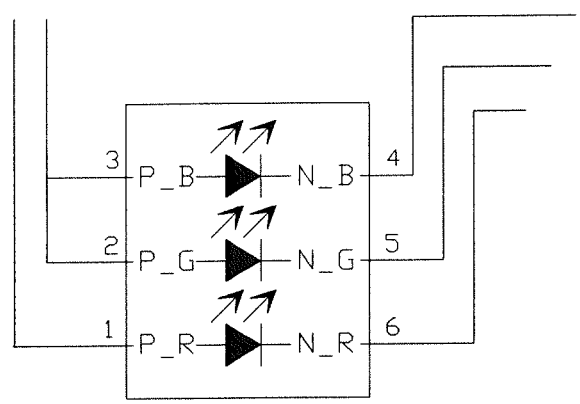
FIG. 10c is a drawing of partial enlargement of a dotted part I1 in FIG. 10b.

FIG. 9a to FIG. 9c are detailed structure diagrams of an LED display according to a preferred embodiment of the disclosure, wherein FIG. 9b is a drawing of partial enlargement of a dotted part D in FIG. 9a; and FIG. 9c is a drawing of partial enlargement of a dotted part D1 in FIG. 9b. FIG. 10a to FIG. 10c are structure diagrams of an LED display according to embodiment 5 of the disclosure, wherein FIG. 10b is a drawing of partial enlargement of a dotted part I in FIG. 10a; and FIG. 10c is a drawing of partial enlargement of a dotted part I1 in FIG. 10b.

A control circuit in the embodiment shown in FIG. 9a to FIG. 9c can include a display control circuit and a driving control circuit, wherein a display driving circuit is connected with the driving control circuit. A switching circuit in the embodiment can include a switching sub-circuit, and the switching sub-circuit includes one or more field effect transistors, wherein a source of each field effect transistor is connected with a grounding end or power end of power supply equipment; a drain of each field effect transistor is connected with an anode or cathode of each LED particle in a corresponding line in an LED display panel; and a gate of each field effect transistor is connected with a corresponding connection terminal in a power supply control port.

Specifically, the switching sub-circuit can include N P-channel Metal Oxide Semiconductor (P-MOS) transistors, wherein a drain of each P-MOS transistor serves as one of output pins of the control circuit, a source of each P-MOS transistor is connected to a power supply end (i.e. VCC end) of the display driving circuit, and a gate of each P-MOS transistor is connected with a connection terminal in the power supply control port of the control circuit; a constant current channel group circuit can include N constant current logic components (which can also be called constant current logic circuits), a second end (i.e. input end of the constant current logic component in the embodiment) of each constant current logic component serves as one of input pins of the display driving circuit, first ends (i.e. output ends) of all the constant current logic components are internally interconnected, and are connected to the grounding end of the power supply equipment as a grounding end (i.e. GND end) of the display driving circuit, and third ends (i.e. control ends of the constant current logic components in the embodiment) of the constant current logic components are connected with a driving control port of the control circuit, and are configured to receive a constant current control signal of a driving circuit (i.e. an LED driving circuit).

In the embodiment, the LED display panel (which can also be called an LED unit) can include a matrix with M lines and N columns of LED particles, wherein the anodes of the LED particles in each line are interconnected to an ith joint, each joint is connected to the output pin corresponding to the drain of the corresponding P-MOS transistor in the switching sub-circuit of the switching circuit, and the cathodes of LEDs in the same primary colors in the LED particles in each column are interconnected to the input ends of the corresponding constant current logic components of the constant current channel group circuit of the display driving circuit, that is, a common cathode of Red lamp tubes (i.e. R LEDs) in the LED particles in each column is interconnected to the input end of the corresponding constant current logic component of the constant current channel group circuit of the display driving circuit; a common cathode of Green lamp tubes (i.e. G LEDs) in the LED particles in each column is interconnected to the input end of the corresponding constant current logic component of the constant current channel group circuit of the display driving circuit; and a common cathode of Blue lamp tubes (i.e. B LEDs) in the LED particles in each column is interconnected to the input end of the corresponding constant current logic component of the constant current channel group circuit of the display driving circuit. Wherein, i is more than or equal to 1 and less than or equal to N, and is a natural number, and the Red lamp tubes, the Green lamp tubes and the Blue lamp tubes can be the R/G/B LEDs respectively.

The LED particles in the LED display panel can also adopt a connection mode as follows: the anodes of the R/G/B LEDs of the LED particles in each line in the LED display panel are interconnected to the output pin corresponding to the drain of the corresponding P-MOS transistor in the switching circuit in the display driving circuit, and the cathodes of the LEDs in the same primary colors in the LED particles in each column are interconnected to the input ends of the corresponding constant current logic components of the constant current channel group circuit of the display driving circuit, that is, the common cathode of the R LEDs in the LED particles in each column is interconnected to the input end of the corresponding constant current logic component of the constant current channel group circuit of the display driving circuit; the common cathode of the G LEDs in the LED particles in each column is interconnected to the input end of the corresponding constant current logic component of the constant current channel group circuit of the display driving circuit; and the common cathode of the B LEDs in the LED particles in each column is interconnected to the input end of the corresponding constant current logic component of the constant current channel group circuit of the display driving circuit.

According to the LED display panel, under the control of the display driving circuit, the power supply control circuit controls a certain P-MOS transistor in the switching sub-circuit (which can be a P-MOS channel group) to be in a conducting state through the power supply control port to supply power to the anodes of the LED particles in the corresponding line on the LED display panel, and the driving control circuit outputs the constant current control signal to each constant current logic component in the constant current channel group circuit through the driving control port to control each constant current logic component to be in a working state of conducting, thereby providing current paths for the cathodes of the lamp tubes of the LED particles in the corresponding columns and realizing the ordered display of the LED unit. Wherein, the cathodes of the lamp tubes of the LED particles in the corresponding columns include the cathodes of the R, G and B lamp tubes, that is, the ordered display of the R lamp tubes, the G lamp tubes and the B lamp tubes of the LED particles in the corresponding columns is controlled respectively.

Specifically, the switching sub-circuit can include N N-channel Metal Oxide Semiconductor (N-MOS) transistors, wherein a drain of each N-MOS transistor serves as one of the output pins of the control circuit, a source of each N-MOS transistor is connected with the grounding end of the power supply equipment as the grounding end (i.e. GND end) of the display driving circuit, and a gate of each N-MOS transistor is connected with one connection terminal in the power supply control port of the control circuit; the constant current channel group circuit includes N constant current logic components (which can also be called constant current logic circuits), the second end (i.e. input end) of each constant current logic component serves as one of the input pins of the display driving circuit, the first ends (i.e. output ends) of all the constant current logic components are internally interconnected, and are connected with the power end of the power supply equipment as the power supply end (i.e. VCC end) of the display driving circuit, and the third ends (i.e. control ends) of the constant current logic components are connected with the display control port of the control circuit, and are configured to receive the constant current control signal of the LED driving circuit.

There are also two connection relationships between the N-MOS transistors included in the switching sub-circuit in the embodiment and the LED particles in the LED display panel.

Specifically, in a first connection mode, the LED display panel (which can be called an LED unit as well as an LED unit board) includes a matrix with M lines and N columns of LED particles, wherein the cathodes of the LED particles in each line are interconnected to the ith joint, each joint is connected to the output pin corresponding to the drain of the corresponding N-MOS transistor in the switching circuit in the display driving circuit, and the anodes of the LEDs in the same primary colors in the LED particles in each column are interconnected to the input ends of the corresponding constant current logic components of the constant current channel group circuit of the display driving circuit, that is, the common anode of the R LEDs in the LED particles in each column is interconnected to the input end of the corresponding constant current logic component of the constant current channel group circuit of the display driving circuit; the common anode of the G LEDs in the LED particles in each column is interconnected to the input end of the corresponding constant current logic component of the constant current channel group circuit of the display driving circuit; and the common anode of the B LEDs in the LED particles in each column is interconnected to the input end of the corresponding constant current logic component of the constant current channel group circuit of the display driving circuit. Wherein, i is a natural number more than or equal to 1.

In a second connection mode, each LED particle in the LED display panel includes an Red lamp tube, a Green lamp tube and a Blue lamp tube, wherein the cathode of the R lamp tube, the cathode of the G lamp tube and the cathode of the B lamp tube in each LED particle in each line are connected in parallel, and are connected with the drain of the corresponding N-MOS transistor in the switching circuit; the anode of the Red lamp tube of each LED particle in each column is connected in parallel, and is connected with the second end of the corresponding constant current logic component in the constant current channel group circuit; the anode of the Green lamp tube of each LED particle in each column is connected in parallel, and is connected with the second end of the corresponding constant current logic component in the constant current channel group circuit; and the anode of the Blue lamp tube of each LED particle in each column is connected in parallel, and is connected with the second end of the corresponding constant current logic component in the constant current channel group circuit.

Specifically, the cathodes of the LED particles in each line in the LED display panel in the embodiment can also be interconnected to the output pin corresponding to the drain of the corresponding N-MOS transistor in the switching circuit in the display driving circuit, and the anodes of the LEDs in the same primary colors in the LED particles in each column are interconnected to the input ends of the constant current logic components of the constant current channel group circuit of the display driving circuit, that is, the common anode of the R LEDs in the LED particles in each column is interconnected to the input end of the corresponding constant current logic component of the constant current channel group circuit of the display driving circuit; the common anode of the G LEDs in the LED particles in each column is interconnected to the input end of the corresponding constant current logic component of the constant current channel group circuit of the display driving circuit; and the common anode of the B LEDs in the LED particles in each column is interconnected to the input end of the corresponding constant current logic component of the constant current channel group circuit of the display driving circuit.

A control circuit in the embodiment shown in FIG. 10a to FIG. 10c can also include a display control circuit and a driving control circuit, wherein a display driving circuit is connected with the driving control circuit. A switching circuit in the embodiment can also include a first switching sub-circuit and a second switching sub-circuit, wherein each of the first switching sub-circuit and the second switching sub-circuit can include one or more field effect transistors; a source of each field effect transistor in the first switching sub-circuit and the second switching sub-circuit is connected with a power end or grounding end of power supply equipment, wherein a drain of each field effect transistor in the first switching sub-circuit is connected with an anode or cathode of an R lamp tube in each LED particle in a corresponding line in the LED display panel, and a gate of each field effect transistor is connected with a corresponding connection terminal in a power supply control port, and is configured to control the power supply of the Red lamp tubes of the LED display panel; and a drain of each field effect transistor in the second switching sub-circuit is connected with anodes or cathodes of a Green lamp tube and a Blue lamp tube in each LED particle in a corresponding line in the LED display panel, and a gate of each field effect transistor is connected with a corresponding connection terminal in the power supply control port, and is configured to control the power supply of the Green lamp tubes and the Blue lamp tubes of the LED display panel.

In the embodiment, the display driving circuit integrates the first switching sub-circuit and the second switching sub-circuit, and each of the two switching sub-circuits includes one or more P-MOS transistors; a source of each P-MOS transistor of the first switching sub-circuit is interconnected as an external pin VCCB of the display driving circuit, and is connected to a connection terminal of the power end of the power supply equipment, a gate of each P-MOS transistor is connected to an R power supply control signal of the power supply control port, and a drain of each P-MOS transistor is connected to anodes (i.e. R anodes of the LED particles in the corresponding line) of the R lamp tubes of the LED particles in the corresponding line in the LED display panel; and a source of each P-MOS transistor of the second switching sub-circuit is interconnected as an external pin VCCA of the display driving circuit, and is connected to a connection terminal of the power end of the power supply equipment, a gate of each P-MOS transistor is connected to G and B power supply control signals of the power supply control port, and a drain of each P-MOS transistor is connected to the anodes (i.e. G anodes and B anodes of the LED particles in the corresponding line) of the G lamp tubes and the B lamp tubes of the LED particles in the corresponding line in the LED display panel.

A power supply control circuit in the embodiment is configured to control one field effect transistor in the first switching sub-circuit to be switched on to supply power to the R lamp tubes in the LED particles in the line corresponding to the field effect transistor in the first switching sub-circuit in the LED display panel; the power supply control circuit is further configured to control the field effect transistor corresponding to the field effect transistor in the first switching sub-circuit in the second switching sub-circuit to be switched on to supply power to the G lamp tubes and the B lamp tubes in the LED particles in the line corresponding to the field effect transistor in the first switching sub-circuit in the LED display panel; the driving control circuit is configured to control each constant current logic component in the constant current channel group circuit to be switched on, and each constant current logic component provides a current path for the LED particles in the column corresponding to the constant current logic component in the LED display panel to control the ordered display of the LED particles in the line corresponding to the field effect transistor in the LED display panel after being conducted.

The switching circuit, the LED driving circuit and the control circuit are integrated in the display driving circuit, and then more display driving circuits can be placed under the condition of not changing the area of the LED display panel, so that the number ratio of the LED particles and the display driving circuits on the LED display with the fixed area is reduced, and the refresh rate is increased.

The field effect transistors in the switching circuit in the embodiment can be P-MOS transistors, each LED display panel can include M lines and N columns LED particles, and each LED particle includes a Red lamp tube, a Green lamp tube and a Blue lamp tube, wherein the anode of the Red lamp tube in the ith LED particle in each line is connected in parallel with an ith joint, and each joint in each line is connected in parallel, and is connected with the drain of the corresponding P-MOS transistor in the first switching sub-circuit; the anodes of the Green lamp tube and the anodes of the Blue lamp tube in the jth LED particle in each line are connected in parallel with a jth joint, and each joint in each line is connected in parallel, and is connected to the drain of the corresponding P-MOS transistor in the second switching sub-circuit; the cathode of the Red lamp tube of each LED particle in each column is connected in parallel, and is connected with the second end of the corresponding constant current logic component in the constant current channel group circuit; the cathode of the Green lamp tube of each LED particle in each column is connected in parallel, and is connected with the second end of the corresponding constant current logic component in the constant current channel logic group circuit; and the cathode of the B lamp tube of each LED particle in each column is connected in parallel, and is connected with the second end of the corresponding constant current logic component in the constant current channel group circuit. Wherein, i is more than or equal to 1 and less than or equal to N, j is more than or equal to 1 and less than or equal to N, both i and j are natural numbers, and the Red lamp tubes, the Green lamp tubes and the Blue lamp tubes can be R/G/B LEDs.

In the embodiment, the display driving circuit integrates the first switching sub-circuit and the second switching sub-circuit, and each of the two switching sub-circuits includes one or more P-MOS transistors; the source of each P-MOS transistor of the first switching sub-circuit is interconnected as an external pin VCCB of the display driving circuit, and is connected to a connection terminal of the power end of the power supply equipment, the gate of each P-MOS transistor is connected to an Red power supply control signal of the power supply control port, and the drain of each P-MOS transistor is connected to the anodes (i.e. R anodes of the LED particles in the corresponding line) of the Red lamp tubes of the LED particles in the corresponding line in the LED display panel; and the source of each P-MOS transistor of the second switching sub-circuit is interconnected as an external pin VCCA of the display driving circuit, and is connected to a connection terminal of the power end of the power supply equipment, the gate of each P-MOS transistor is connected to Green and Blue power supply control signals of the power supply control port, and the drain of each P-MOS transistor is connected to the anodes (i.e. Green anodes and Blue anodes of the LED particles in the corresponding line) of the Green lamp tubes and the Blue lamp tubes of the LED particles in the corresponding line in the LED display panel.

In the embodiment, the anode of the R lamp tube in the ith LED particle in each line in the LED display panel is connected in parallel with the ith joint, and each joint in each line is connected in parallel, and is connected with the drain of the corresponding P-MOS transistor in the first switching sub-circuit; the anode of the G lamp tube and the anode of the B lamp tube in the jth LED particle in each line are connected in parallel with the jth joint, and each joint in each line is connected in parallel, and is connected with the drain of the corresponding P-MOS transistor in the second switching sub-circuit; the cathodes of the LEDs in the same primary colors in the LED particles in each column are interconnected to the input ends of the constant current logic components of the constant current channel group circuit of the display driving circuit 1, that is, the common cathode of the R lamp tubes (i.e. R display units) in the LED particles in each column is interconnected to the input end of the corresponding constant current logic component of the constant current channel group circuit of the display driving circuit 1; the common cathode of the G lamp tubes (i.e. G display units) in the LED particles in each column is interconnected to the input end of the constant current logic component of the constant current channel group circuit of the display driving circuit 1; and the common cathode of the B lamp tubes (i.e. B display units) in the LED particles in each column is interconnected to the input end of the corresponding constant current logic component of the constant current channel group circuit of the display driving circuit 1.

In the embodiment, power supply voltages of the first switching sub-circuit and the second switching sub-circuit can be different, a power supply voltage of VCCB is preferably 1.6V, and can be lower than that of the pin VCCA, and 1.6V is obtained by subtracting a typical working voltage (1.8-2V) of the R lamp tubes from typical working voltages (3.4-3.6V) of the G and B lamp tubes, so that the power supply voltages of the R/G/B LEDs are differentially controlled to further reduce the power consumption of the LED display.

In the embodiment, the power supply control circuit of the display driving circuit 1 controls the P-MOS transistors corresponding to the same lines in the first switching sub-circuit and the second switching sub-circuit to be in a state of conduction through the power supply control port to supply power to the anodes of the R LEDs and the G/B LEDs of the LED particles in the corresponding lines in the LED display panel, and the driving control circuit outputs an R display control signal/G display control signal/B display control signal to each constant current logic component in a first constant current channel group circuit/second constant current channel group circuit/third constant current channel group circuit through a first R display control sub-port/first G display control sub-port/first B display control sub-port to control each constant current logic component in the three constant current channel group circuits to be in a working state of conducting, thereby providing current paths for the Red cathodes, Green cathodes and Blue cathodes of the LED particles in the corresponding columns and realizing the ordered display of the LED particles.

Under the condition that the field effect transistors are P-MOS transistors, the LED display panel can also be implemented by adopting an implementation mode as follows: the LED display panel can include M lines and N columns of LED particles, and each LED particle includes an R lamp tube, a G lamp tube and a B lamp tube, wherein the cathode of the Red lamp tube in each LED particle in each line is connected in parallel, and is connected with the drain of the corresponding P-MOS transistor in the first switching sub-circuit; the anodes of the Green lamp tube and the Blue lamp tube in each LED particle in each line are connected in parallel, and are connected with the drain of one corresponding P-MOS transistor in the second switching sub-circuit; the cathode of the R lamp tube of each LED particle in each column is connected in parallel, and is connected with the second end of the corresponding constant current logic component in the constant current channel group circuit; the cathode of the G lamp tube of each LED particle in each column is connected in parallel, and is connected with the second end of the corresponding constant current logic component in the constant current channel group circuit; and the cathode of the B lamp tube of each LED particle in each column is connected in parallel, and is connected with the second end of the corresponding constant current logic component in the constant current channel group circuit.

The field effect transistors in the switching circuit can be N-MOS transistors, the LED display panel includes M lines and N columns of LED particles, and each LED particle includes an R lamp tube, a G lamp tube and a B lamp tube, wherein the cathode of the R lamp tube in each LED particle in each line is connected in parallel, and is connected with the drain of the corresponding N-MOS transistor in the first switching sub-circuit; the cathode of the G lamp tube and the cathode of the B lamp tube in each LED particle in each line are connected in parallel, and are connected with the drain of the corresponding N-MOS transistor in the second switching sub-circuit; the anode of the R lamp tube of each LED particle in each column is connected in parallel, and is connected with the second end of the corresponding constant current logic component in the constant current channel group circuit; the anode of the G lamp tube of each LED particle in each column is connected in parallel, and is connected with the second end of the corresponding constant current logic component in the constant current channel group circuit; and the anode of the B lamp tube of each LED particle in each column is connected in parallel, and is connected with the second end of the corresponding constant current logic component in the constant current channel group circuit.

In addition, under the condition that the field effect transistors are N-MOS transistors, the cathode of the R lamp tube in the ith LED particle in each line in the LED display panel is connected in parallel with the ith joint, and each joint in each line is connected in parallel, and is connected with the drain of the corresponding N-MOS transistor in the first switching sub-circuit; the cathode of the G lamp tube and the cathode of the B lamp tube in the jth LED particle in each line are connected in parallel with the jth joint, and each joint in each line is connected in parallel, and is connected with the drain of the corresponding N-MOS transistor in the second switching sub-circuit; the anode of the R lamp tube of each LED particle in each column is connected in parallel, and is connected with the second end of the corresponding constant current logic component in the constant current channel group circuit; the anode of the G lamp tube of each LED particle in each column is connected in parallel, and is connected with the second end of the corresponding constant current logic component in the constant current channel group circuit; and the anode of the B lamp tube of each LED particle in each column is connected in parallel, and is connected with the second end of the corresponding constant current logic component in the constant current channel group circuit.

In the embodiment, the display driving circuit integrates the first switching sub-circuit and the second switching sub-circuit, and each of the two switching sub-circuits includes one or more N-MOS transistors; the source of each N-MOS transistor of the first switching sub-circuit is interconnected as an external pin GND of the display driving circuit, and is connected to a connection terminal of the power end of the power supply equipment, the gate of each N-MOS transistor is connected to the R power supply control signal of the power supply control port, and the drain of each N-MOS transistor is connected to the anodes (i.e. the R anodes of the LED particles in the corresponding line) of the R lamp tubes of the LED particles in the corresponding line in the LED display panel; and the source of each N-MOS transistor of the second switching sub-circuit is interconnected as the external pin GND of the display driving circuit, and is connected to a connection terminal of the power end of the power supply equipment, the gate of each N-MOS transistor is connected to the G and B power supply control signals of the power supply control port, and the drain of each N-MOS transistor is connected to the anodes (i.e. the G anodes and B anodes of the LED particles in the corresponding line) of the G lamp tubes and the B lamp tubes of the LED particles in the corresponding line in the LED display panel.

The LED driving circuit can be the same as that shown in the above embodiment, the second end (i.e. input end) of each constant current logic component in the LED driving circuit serves as one of the input pins of the display driving circuit, the first ends (i.e. output ends) of all the constant current logic components are internally interconnected, and are connected to the power end of the power supply equipment as the VCC end of the display driving circuit, and the third ends (i.e. control ends) of the constant current logic components are connected with the driving control port of the control circuit, and are configured to receive the constant current control signal of the LED driving circuit.

The LED driving circuit in the embodiment can include a first constant current channel group circuit, a second constant current channel group circuit and a third constant current channel group circuit, wherein the switching circuit can include the switching sub-circuit or two switching sub-circuits, i.e. the first switching sub-circuit and the second switching sub-circuit, and a connection mode is the same as that in the above embodiment. In the embodiment, the first constant current channel group circuit can include one or more constant current logic components, wherein a first end of each constant current logic component is connected with the power end or grounding end of the power supply equipment, the third end of each constant current logic component is connected with the first R display control sub-port of the driving control port, and a second end of each constant current logic component is connected with the anode or cathode of the R lamp tube in each LED particle in the corresponding column in the LED display panel, and is configured to control the display of the R lamp tubes of the LED display panel; the second constant current channel group circuit includes one or more constant current logic components, wherein a first end of each constant current logic component is connected with the power end or grounding end of the power supply equipment, a third end of each constant current logic component is connected with the first G display control sub-port of the driving control port, and a second end of each constant current logic component is connected with the anode or cathode of the G lamp tube in each LED particle in the corresponding column in the LED display panel, and is configured to control the display of the Green lamp tubes in the LED display panel; and the third constant current channel group circuit includes one or more constant current logic components, wherein a first end of each constant current logic component is connected with the power end or grounding end of the power supply equipment, a third end of each constant current logic component is connected with the first B display control sub-port of the driving control port, and a second end of each constant current logic component is connected with the anode or cathode of the Blue lamp tube in each LED particle in the corresponding column in the LED display panel, and is configured to control the display of the Blue lamp tubes of the LED display panel. Wherein, the first constant current logic group circuit can be an R constant current channel group circuit, the second constant current logic group circuit can be G constant current channel group circuit, and the third constant current logic group circuit can be a B constant current channel group circuit.

The driving control circuit is configured to control each constant current logic component in the first constant current channel group circuit to be switched on through the first R display control sub-port, and each constant current logic component provides a current path for the Red lamp tubes in the LED particles in the column corresponding to the constant current logic component in the LED display panel to control the display of the Red lamp tubes of the LED particles in the line corresponding to the field effect transistor in the LED display panel after being conducted; the driving control circuit is further configured to control each constant current logic component in the second constant current channel group circuit to be conducted through the first G display control sub-port, and each constant current logic component provides a current path for the Green lamp tubes in the LED particles in the column corresponding to the constant current logic component in the LED display panel to control the display of the Green lamp tubes of the LED particles in the line corresponding to the field effect transistor in the LED display panel after being conducted; and the driving control circuit is further configured to control each constant current logic component in the third constant current channel group circuit to be conducted through the first B display control sub-port, and each constant current logic component provides a current path for the Blue lamp tubes in the LED particles in the column corresponding to the constant current logic component in the LED display panel to control the display of the Blue lamp tubes of the LED particles in the line corresponding to the field effect transistor in the LED display panel after being conducted.

The condition that the field effect transistors are P-MOS transistors is taken as an example. The LED display panel includes M lines and N columns of LED particles, and each LED particle includes an Red lamp tube, a Green lamp tube and a Blue lamp tube, wherein the anode of the Red lamp tube in each LED particle in each line is connected in parallel, and is connected with the drain of the corresponding P-MOS transistor in the first switching sub-circuit; the anode of the Green lamp tube and the anode of the Blue lamp tube in each LED particle in each line are connected in parallel, and are connected with the drain of the corresponding P-MOS transistor in the second switching sub-circuit as connection terminals of the anode of the LED display panel; the cathode of the Red lamp tube of each LED particle in each column is connected in parallel, and is connected with the second end of the corresponding constant current logic component in the first constant current channel group circuit; the cathode of the Green lamp tube of each LED particle in each column is connected in parallel, and is connected with the second end of the corresponding constant current logic component in the second constant current channel group circuit; and the cathode of the Blue lamp tube of each LED particle in each column is connected in parallel, and is connected with the second end of the corresponding constant current logic component in the third constant current channel group circuit.

In case of the LED driving circuit includes three constant current channel group circuits, like the condition that the LED driving circuit only includes one constant current channel group circuit, the connection relationship between the LED particles on the LED unit board is uninfluenced, and when the LED particles are connected with the LED control system, the aim of providing the constant current paths for the LED particles by virtue of constant current channels can be fulfilled only by connecting the LEDs in different primary colors to the constant current channel group circuits controlling the LEDs in the corresponding primary colors.

From the above, it can be seen that the disclosure achieves technical effects as follows: by the disclosure, the clock delay circuit is integrated in the LED driving circuit, and can delay the timing control signal into a signal synchronous with the data control signal, so that the acquisition of wrong data in the data control signal is prevented; moreover, the input and output ports for the timing control signal are integrated in the LED driving circuit, so that the number of the wires on the PCB is reduced, the problems of high difficulty in the wiring of the PCB, relatively lower anti-interference capability of control signals and LED display error, which are caused by large control signal number and serial output data delay, during the cascading application of the LED driving circuit in the related art are solved, and the effects of synchronizing the data control signal and the timing control signal, reducing the number of the wires on the PCB and reducing the influence of the timing control signal on the signal of the PCB are achieved; therefore, the accurate display of the LEDs is ensured, the signal transmission quality and anti-interference capability of an LED unit board are improved, and the difficulty in the wiring of the LED unit board is lowered.

Obviously, those skilled in the art should know that each module or step of the disclosure can be implemented by a universal computing device, and the modules or steps can be concentrated on a single computing device or distributed on a network formed by a plurality of computing devices, and can optionally be implemented by programmable codes executable for the computing devices, so that the modules or steps can be stored in a storage device for execution with the computing devices, or can form each integrated circuit module, or multiple modules or steps therein can form a single integrated circuit module for implementation. As a consequence, the disclosure is not limited to any specific hardware and software combination.

The above is only the preferred embodiment of the disclosure and not intended to limit the disclosure. For those skilled in the art, the disclosure can have various modifications and variations. Any modifications, equivalent replacements, improvements and the like within the spirit and principle of the disclosure shall fall within the scope of protection of the disclosure.

What is claimed is:

1. A Light-Emitting Diode (LED) driving circuit, comprising a driving control circuit and a constant current channel group circuit, wherein
    the driving control circuit comprises: a logic control circuit and a clock delay circuit, wherein
    the logic control circuit is connected with the constant current channel group circuit, and is configured to control an ordered switching-on or switching-off of the constant current channel group circuit by virtue of a data control signal; and
    the clock delay circuit is connected with the logic control circuit, and is configured to acquire a timing control signal synchronous with the data control signal, and output the timing control signal to another LED driving circuit;
    wherein the timing control signal comprises: a shift pulse signal; an input end of the driving control circuit comprises: a shift pulse input port; an output end of the driving control circuit comprises: a shift pulse output port, wherein the clock delay circuit comprises a shift delay input port, a clock delay sub-circuit and a delay output port, wherein the shift delay input port is connected with the shift pulse input and is configured to receive the shift pulse signal; the clock delay sub-circuit is connected between the shift delay input port and the logic control circuit, and is configured to perform delaying processing on the shift pulse signal to acquire a shift pulse signal synchronous with the data control signal by virtue of delay data generated by the clock delay sub-circuit; and the delay output port is connected between the clock delay sub-circuit and the shift pulse output port, and is configured to output the shift pulse signal;
    wherein the clock delay circuit comprises: a reading device, wherein an input end of the reading device is connected with the logic control circuit, and is configured to read the delay data in a delay table of the logic control circuit; and an output end of the reading device is connected with the clock delay sub-circuit, and is configured to transmit the delay data to the clock delay sub-circuit.

2. The driving circuit according to claim 1, wherein the timing control signal comprises: a data latching signal; the input end of the driving control circuit comprises: a data latching input port; the logic control circuit comprises a latching input port; and
    the latching input port is connected with the data latching input port, and is configured to receive the data latching signal.

3. The driving circuit according to claim 1, wherein the timing control signal comprises: an enable control signal; the input end of the driving control circuit comprises: an enable control input port; the logic control circuit comprises an enable input port; and
    the enable input port is connected with the enable control input port, and is configured to receive the enable control signal.

4. The driving circuit according to claim 1, wherein the input end of the driving control circuit comprises: a data input port; the output end of the driving control circuit comprises: a data control output port; the logic control circuit comprises: a logic control sub-circuit, a first control input port, a first control output port and a second control output port, wherein
    the first control input port is connected with the data input port, and is configured to receive the data control signal;
    the logic control sub-circuit is connected between the first control input port and the clock delay circuit, and is configured to generate a logic control signal by virtue of the data control signal and the timing control signal;
    the first control output port is connected with the logic control sub-circuit, is connected with the constant current channel group circuit through a constant current channel control signal set, and is configured to output the logic control signal to the constant current channel group circuit; and the second control output port is connected between the logic control sub-circuit and the data control output port, and is configured to output the data control signal.

5. The driving circuit according to claim 4, wherein the constant current channel group circuit comprises one or more constant current logic components, wherein
a first end of each constant current logic component is connected with a power end or grounding end of power supply equipment;
a second end of each constant current logic component is connected with anodes or cathodes of LED particles in a corresponding column in an LED display panel; and
a third end of each constant current logic component is connected with a corresponding connection terminal in the constant current channel control signal set.

6. The driving circuit according to claim 5, wherein the logic control sub-circuit comprises:
a sub-processor, connected between the constant current channel group circuit and the reading device and configured to read the delay data corresponding to the number of the constant current logic components in the constant current channel group circuit.

7. A Light-Emitting Diode (LED) control system, comprising: a display driving circuit, the display driving circuit comprises multiple LED driving circuits according to claim 1,
the display driving circuit further comprises a display control circuit, wherein the display control circuit is connected with a control end of each LED driving circuit through a driving control port, and is configured to control switching-on or switching-off of each LED driving circuit.

8. The system according to claim 7, wherein the driving control port comprises: a data output port, a shift pulse output port, a data latching output port and an enable control output port, wherein
a data input port of a first LED driving circuit is connected with the data output port, and is configured to receive a data control signal, a data input port of a (i+1)th LED driving circuit is connected with a data control output port of a ith LED driving circuit, and is configured to receive the data control signal, and i is a natural number greater than or equal to 1;
a shift pulse input port of the first LED driving circuit is connected with the shift pulse output port, and is configured to receive a shift pulse signal, a shift pulse input port of the (i+1)th LED driving circuit is connected with a second delay output port of the ith LED driving circuit, and is configured to receive a shift pulse signal synchronous with the data control signal, and i is a natural number greater than or equal to 1;
a data latching input port of each LED driving circuit is connected with the data latching output port respectively, and is configured to receive a data latching signal; and
an enable control input port of each LED driving circuit is connected with the enable control output port respectively, and is configured to receive an enable control signal.

9. The system according to claim 7, the display driving circuit further comprises a switching circuit, wherein
a first end of one of the switching circuit and a constant current channel group circuit in each LED driving circuit is connected to a power end of power supply equipment, and a first end of the other of the switching circuit and the constant current channel group circuit in each LED driving circuit is connected to a grounding end of the power supply equipment;
a second end of one of the switching circuit and the constant current channel group circuit in each LED driving circuit is connected with an anode of an LED display panel, and a second end of the other of the switching circuit and the constant current channel group circuit in each LED driving circuit is connected with a cathode of the LED display panel;
the control circuit, comprising a power supply control circuit, wherein the power supply control circuit is connected with a third end of the switching circuit through a power supply control port, and is configured to control switching-on or switching-off of the switching circuit; wherein
the switching circuit is configured to control power supply of the LED display panel, and the LED driving circuit is configured to control ordered display of the LED display panel.

10. The system according to claim 9, wherein the switching circuit comprises a switching sub-circuit, and the switching sub-circuit comprises one or more field effect transistors, wherein
a source of each field effect transistor is connected with the power end or grounding end of the power supply equipment;
a drain of each field effect transistor is connected with an anode or cathode of each LED particle in a corresponding line in the LED display panel; and
a gate of each field effect transistor is connected with a corresponding connection terminal in the power supply control port.

11. The system according to claim 9, wherein the switching circuit comprises a first switching sub-circuit and a second switching sub-circuit, wherein
each of the first switching sub-circuit and the second switching sub-circuit comprises one or more field effect transistors, and a source of each field effect transistor in the first switching sub-circuit and the second switching sub-circuit is connected with the power end or grounding end of the power supply equipment;
a drain of each field effect transistor in the first switching sub-circuit is connected with an anode or cathode of a Red (R) lamp tube in each LED particle in a corresponding line in the LED display panel, and a gate of each field effect transistor is connected with a corresponding connection terminal in the power supply control port, and is configured to control the power supply of the Red lamp tubes of the LED display panel; and
a drain of each field effect transistor in the second switching sub-circuit is connected with anodes or cathodes of a Green (G) lamp tube and a Blue (B) lamp tube in each LED particle in a corresponding line in the LED display panel, and a gate of each field effect transistor is connected with a corresponding connection terminal in the power supply control port, and is configured to control the power supply of the Green lamp tubes and the Blue lamp tubes of the LED display panel.

12. The driving circuit according to claim 2, wherein the input end of the driving control circuit comprises: a data input port; the output end of the driving control circuit comprises: a data control output port; the logic control circuit comprises: a logic control sub-circuit, a first control input port, a first control output port and a second control output port, wherein the first control input port is connected with the data input port, and is configured to receive the data control signal;

the logic control sub-circuit is connected between the first control input port and the clock delay circuit, and is configured to generate a logic control signal by virtue of the data control signal and the timing control signal;

the first control output port is connected with the logic control sub-circuit, is connected with the constant current channel group circuit through a constant current channel control signal set, and is configured to output the logic control signal to the constant current channel group circuit; and the second control output port is connected between the logic control sub-circuit and the data control output port, and is configured to output the data control signal.

13. The driving circuit according to claim 3, wherein the input end of the driving control circuit comprises: a data input port; the output end of the driving control circuit comprises: a data control output port; the logic control circuit comprises: a logic control sub-circuit, a first control input port, a first control output port and a second control output port, wherein the first control input port is connected with the data input port, and is configured to receive the data control signal;

the logic control sub-circuit is connected between the first control input port and the clock delay circuit, and is configured to generate a logic control signal by virtue of the data control signal and the timing control signal;

the first control output port is connected with the logic control sub-circuit, is connected with the constant current channel group circuit through a constant current channel control signal set, and is configured to output the logic control signal to the constant current channel group circuit; and the second control output port is connected between the logic control sub-circuit and the data control output port, and is configured to output the data control signal.

* * * * *